US007188005B2

(12) United States Patent
Toba et al.

(10) Patent No.: US 7,188,005 B2

(45) Date of Patent: Mar. 6, 2007

(54) VEHICLE CAPABLE OF AUDITORILY INFORMING ITS STATE AND METHOD FOR AUDITORILY INFORMING STATE OF VEHICLE

(75) Inventors: Nobukazu Toba, Hamamatsu (JP); Kiyohisa Sugii, Kakegawa (JP); Yukio Tada, Iwata (JP); Motoaki Miyabe, Hamamatsu (JP); Osamu Maeda, Iwata (JP); Akihiro Yoshizawa, Iwata (JP)

(73) Assignee: Yamaha Corporation, Hamamatsu (JP)

( * ) Notice: Subject to any disclaimer, the term of this patent is extended or adjusted under 35 U.S.C. 154(b) by 85 days.

(21) Appl. No.: 10/442,751

(22) Filed: May 21, 2003

(65) Prior Publication Data

US 2003/0220722 A1 Nov. 27, 2003

(30) Foreign Application Priority Data

May 27, 2002 (JP) ...................................... 2002-152127
Mar. 5, 2003 (JP) ...................................... 2003-058728

(51) Int. Cl.
*G05D 1/00* (2006.01)

(52) U.S. Cl. ............................... 701/1; 701/36; 701/53; 701/22; 340/384.1; 340/425.5; 340/426.14; 340/425.25; 340/438; 340/474; 340/500; 280/1; 180/313

(58) Field of Classification Search ..................... 701/1, 701/36, 53, 22; 340/384.1, 425.5, 426.14, 340/425.25, 438, 474, 500; 280/1; 180/313
See application file for complete search history.

(56) References Cited

U.S. PATENT DOCUMENTS

| | | | |
|---|---|---|---|
| 5,635,903 | A | 6/1997 | Koike et al. |
| 6,356,185 | B1 | 3/2002 | Plugge et al. |
| 2002/0041692 | A1 | 4/2002 | Seto et al. |

FOREIGN PATENT DOCUMENTS

| | | | |
|---|---|---|---|
| DE | 3420463 | A1 | 12/1985 |
| DE | 19701801 | A1 | 7/1998 |
| EP | 0 511 447 | A2 | 11/1992 |
| GB | 2351634 | | 1/2001 |
| GB | 2354872 | | 4/2001 |
| JP | 07-182587 | | 7/1995 |
| JP | 2820810 | | 8/1998 |
| JP | 3081267 | | 6/2000 |
| JP | 2000-330700 | | 11/2000 |
| JP | 2002-114107 | | 4/2002 |

*Primary Examiner*—Gertrude A Jeanglaude
(74) *Attorney, Agent, or Firm*—Morrison & Foerster LLP

(57) ABSTRACT

Operational states of one or more operators employed in a vehicle are detected to generate operational information corresponding to the detected operational states. Also, one or more traveling states of the vehicle are detected to generate traveling information corresponding to the detected traveling states. There is provided a table storing correspondency between various operational and traveling information and various sound control information, and sound control information corresponding to generated operational or traveling information is obtained with reference to the table. Sound signal is generated on the basis of the obtained sound control information to auditorily inform a user of the vehicle of the operational or traveling state of the vehicle. Contents of the table may be changed as desired by the user. There may be provided a plurality of tables so that the user can select any one of the tables.

17 Claims, 4 Drawing Sheets

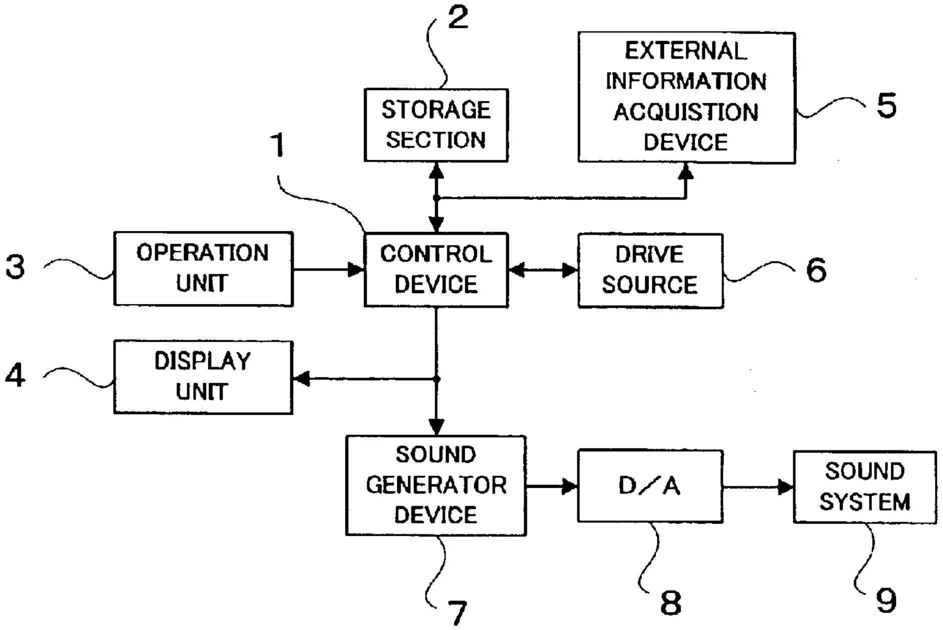
F I G. 1
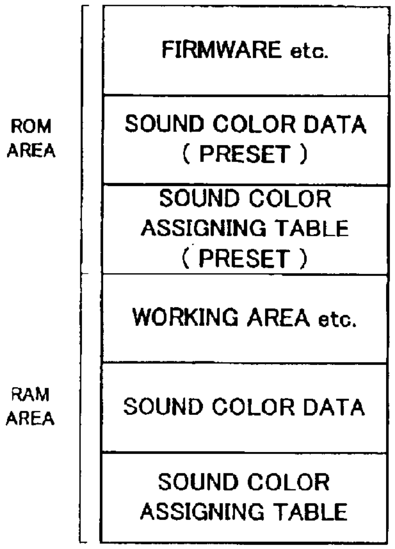
F I G. 2A
| EVENT TYPE | SOUND COLOR No. | | | |
|---|---|---|---|---|
| | Tbl 1 | Tbl 2 | … | Tbl N |
| ACTIVATION | 0 | 0 | | 256 |
| DEACTIVATION | 1 | 1 | | 257 |
| ACCELERATION | 2 | 2 | | 258 |
| BRAKE | 3 | 3 | | 259 |
| WINKER R | 4 | 4 | | 260 |
| WINKER L | 4 | 5 | | 261 |
| STEERING WHEEL R | 6 | 6 | | 262 |
| STEERING WHEEL L | 6 | 7 | | 263 |
| HORN | 8 | 8 | | 264 |
| LIGHT | 9 | 9 | | 265 |
| NUMBER OF ROTATIONS | 10 | 10 | | 266 |
| : | : | : | | : |
F I G. 2B

VEHICLE CAPABLE OF AUDITORILY INFORMING ITS STATE AND METHOD FOR AUDITORILY INFORMING STATE OF VEHICLE

BACKGROUND OF THE INVENTION

The present invention relates generally to vehicles which artificially generate predetermined sounds, such as effect sounds and/or musical sounds, in response to any of predetermined traveling (running) states and operational state of the vehicle. More particularly, the present invention to an improved vehicle which allows a user to change or modify a sound to be artificially generated in response to any of a plurality of traveling and operational states so that a sound suiting a user's preference can be generated at any necessary time, and a method for auditorily informing particular states of a vehicle There have been known vehicles which can generate predetermined sounds, such as effect sounds and/or musical sounds, in response to any of traveling and operational states of the vehicle. Namely, some vehicles today, such as motor vehicles and motor cycles, are designed to generate, in response to a predetermined traveling or operational state of the vehicle, predetermined sounds, such as effect sounds and/or musical sounds, appealing to the auditory sense of the driver (human operator of the vehicle) and/or pedestrians, in order to inform the driver of the predetermined traveling or operational state of the vehicle or call attention of the pedestrians and the like to the vehicle. For example, when a vehicle is running at more than a predetermined high speed, the vehicle generates speed warning sounds, such as "pikon pikon" (Japanese onomatopoeia), to call the driver's attention to the high-speed traveling state of the vehicle. When a winker or blinker (direction indicator) has been operated by the driver, the vehicle generates winker blinking sounds, such as "tick-tack" (English onomatopoeia), to inform the driver of the vehicle's operational state. Further, when a vehicle is moving backward, the vehicle generates predetermined warning, such as "beep beep" (English onomatopoeia) or "moving back, moving back", to call attention of not only the driver but also pedestrians. Also under development today are electrically-powered vehicles, such as electric scooters and electric cars, which are driven to travel by an electric motor. To secure their silent operation, such electromotive vehicles are arranged to deliberately generate false engine sounds so as to inform the driver of the traveling and operational states of the vehicle or call attention of pedestrians an the like to the vehicle.

However, sounds, such as predetermined effect sounds and/or musical sounds, generated by the conventional vehicles in accordance with a plurality of factors, i.e. traveling and operational states of the vehicles, are similar, stereotyped (standardized), monotonous sounds completely lacking playfull touches, and these sounds can not be changed as desired by the users. Thus, the sounds generated by the conventional vehicles are very inconvenient in that they sometimes fail to appropriately call attention of the driver and pedestrians to the vehicle so that the driver and pedestrians may be endangered. Namely, where similar, stereotyped, monotonous sounds are generated from various vehicles, the driver and pedestrians tend to get too accustomed to the sounds and can not quickly identify which of many vehicles around them is generating the sounds. Consequently, the conventional vehicles can not call proper attention of the driver and pedestrians. Because, as noted above, the existing vehicles can only generate similar, stereotyped, monotonous sounds in accordance with any of traveling states (e.g., accelerating state) and operational states (e.g., operational state of a winker, steering wheel or accelerator) and can not change the sounds in accordance with driver's preference, there have been encountered the problem that not only operating the vehicle tends to be uninteresting and boring to the driver but also the incapability to positively call attention of the driver and pedestrians would endanger the driver and pedestrians.

SUMMARY OF THE INVENTION

In view of the foregoing, it is an object of the present invention to provide a novel vehicle which can positively call attention of a driver and pedestrians with original sounds by allowing a user to change or modify predetermined sounds, such as effect sounds and/or musical sounds, to be generated in accordance with any of traveling and operational states of the vehicle and which allows the driver to drive the vehicle with a lot of pleasure and fun, as well as a method for auditorily informing particular states of a vehicle.

The present invention provides a vehicle which comprises: a state information generation section that generates state information indicative of a state of the vehicle, the state information including at least operational information that is generated in response to operation of one or more operators provided in the vehicle; an association section that associates various state information and various sound control information; a sound control information acquisition section that refers to the association section in accordance with state information generated by the state information generation section, to acquire sound control information corresponding to the generated state information; and a sound generation section that generates a sound signal on the basis of the state information acquired by the sound control information acquisition section.

In the present invention, various state information indicative of various states of the vehicle and various sound control information are associated with each other in advance, and a sound signal is generated, in response to generated state information, on the basis of sound control information associated with, or corresponding to, the generated state information. Thus, the present invention can generate a sound (effect sound or musical sound) having a given characteristic depending on the manner of the association between the state information and the sound control information. As a result, the present invention can provide a novel vehicle which can give the user pleasure of self-expressing himself or herself and driving the vehicle and which can positively call attention of the driver and pedestrians by section of audible sounds.

According to a second aspect of the present invention, there is provided a vehicle which comprises: an operational state detection section that detects operational states of one or more operators provided in the vehicle and generates operational information corresponding to the detected operational states; a traveling state detection section that detects one or more traveling states of the vehicle and generates traveling information corresponding to the detected traveling states; an association section that associates relationship between various operational state information and traveling state information and various sound control information; a change section that changes the relationship associated by the association section; a sound control information acquisition section that refers to the relationship changed via the change section, to acquire sound control information corresponding to at least one of operational information and traveling information generated by the operational state detection section and traveling state detection section; and a sound generation section that generates a sound signal on the basis of the sound control information acquired by the sound control information acquisition section.

The invention thus arranged allows the user to change associated relationship, i.e. correspondency, between various operational state information and traveling state information and various sound control information. As a result, the user can change characteristics of various sounds, to be generated in response to any of operational states and traveling states of the vehicle, as desired by the user, i.e. in accordance with preference of the user.

According to a third aspect of the present invention, there is provided a vehicle which comprises: an operational state detection section that detects operational states of one or more operators provided in the vehicle and generates operational information corresponding to the detected operational states; a traveling state detection section that detects one or more traveling states of the vehicle and generates traveling information corresponding to the detected traveling states; a table section that includes a plurality of tables each associating relationship between various operational information and traveling information and various sound control information; a selection section for selecting any one of the plurality of tables; a sound generation section that refers to the relationship associated by the table selected via the selection section, to acquire sound control information corresponding to at least one of operational information and traveling information generated by the operational state detection section and traveling state detection section; and a sound generation section that generates a sound signal on the basis of the sound control information acquired by the sound control information acquisition section. The invention thus arranged is very advantageous in that it allows the user to readily change characteristics of various sounds, to be generated in accordance with any of operational states and traveling states of the vehicle, by just selecting any one of the tables.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 1 is a block diagram showing a general setup of a vehicle in accordance with an embodiment of the present invention;

FIGS. 2A and 2B are conceptual diagrams showing various data stored in predetermined storage areas of a ROM and RAM in the vehicle;

DETAILED DESCRIPTION OF THE EMBODIMENTS

Figure 3:
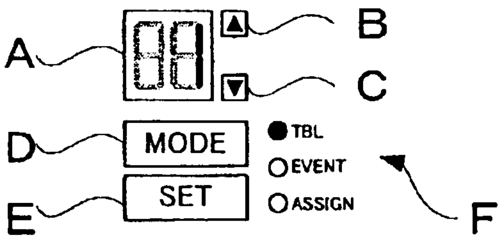
FIG. 3 is a conceptual diagram showing an example of an operator panel in the vehicle.

FIG. 1 is a block diagram showing an example of a general setup of a vehicle in accordance with an embodiment of the present invention. As shown, the vehicle carries out various processes under control of a control device 1 in the form of, for example, a one-chip microcomputer which includes a microprocessor unit (CPU), a read-only memory (ROM) and a random access memory (RAM). Namely, behavior of the entire vehicle is controlled by the control device 1 executing predetermined control programs (software programs). Particularly, the control device 1 in the instant embodiment executes later-described event processing (see FIG. 4) to detect operational states of an operation unit 3, such as those of a steering wheel, accelerator pedal and brake pedal and ON/OFF operation of various switches, and traveling states of the vehicle, such as an accelerating/decelerating state and the number of rotations of a drive source 6 in the form of, for example, an electric motor or engine. Then, the control device 1 controls the vehicle to generate, toward the interior the vehicle and/or outside the vehicle, predetermined effect sounds and/or musical sounds corresponding to the detected operational and traveling states. Namely, the control device 1 constantly monitors operational states of various operators on the operation unit 3 and traveling states of the vehicle, and once predetermined detection information has been received, the control device 1 generates a predetermined sound generation event corresponding to the received detection information. Then, on the basis of the predetermined sound generation event, the control device 1 gives a sound generator device 7 a sound signal generation/deadening instruction or the like so that predetermined or predefined effect sounds or musical sounds are generated as will be later described in detail.

The above-mentioned control of the entire vehicle may be implemented by microprograms to be executed by a DSP (Digital Signal Processor), rather than by the computer software programs. Alternatively, the control of the entire vehicle may be performed by a dedicated hardware apparatus that includes discrete circuits or integrated or large-scale integrated circuitry, rather than by such programs.

To the control device 1 are connected a storage section 2, the above-mentioned operation unit 3, a display unit 4, an external information acquisition device 5, the above-mentioned drive source 6 and the sound generator device 7. The storage section 2 includes a ROM, RAM, hard disk and/or other suitable form of storage device, which has prestored therein various control programs to be executed by the control device 1 for engine control and sound generator control and various data, such as sound color data and sound color assigning tables, to be used for the sound generator control. Although the storage section 2 preferably includes semiconductor storage devices, like a ROM and RAM, impervious to vibrations and shakes caused during travel of the vehicle, the storage section 2 may be a hard disk or the like as long as it is constructed to effectively resist vibrations and shakes caused during travel of the vehicle. The operation unit 3 includes various operators directly operable by a human operator or driver of the vehicle, such as: the steering wheel; pedals like accelerator and brake pedals; various switches like switches for turning on/off headlights, hazard lights, winkers and other lights or lamps; operators of the operator panel for setting sound colors; and door knobs. When any one of the operators on the operator panel has been operated, the control device 1 changes a sound color corresponding to a current sound generation event generated in response to the operation of the operator. When any one of the other operators on the operation unit 3 has been operated, the control device 1 generates a sound generation event corresponding to the operated operator and controls the sound generator device 7, on the basis of the generated sound generation event, to generate predetermined effect sounds and/or musical sounds. The display unit 4 includes, for example, meters for indicating a traveling speed of the vehicle, the number of engine rotations, lights such as the headlights, hazard lights and winkers, display lamps for indicating ON/OFF states of the lights and a liquid crystal display (LCD) panel and/or CRT for displaying various other information.

The external information acquisition device 5 is a communication device or external storage device provided for additionally obtaining any of various information, such as a control program, sound color data and sound color assigning table, from outside the vehicle. If the external information acquisition device 5 is a communication device, the communication device (5) is connected to a communication network, such as a LAN, Internet or telephone line network, to receive various information from external equipment, such as a server apparatus connected to the communication device (5) via the network, and it additionally stores the received information in the storage section 2 so that the additionally stored information can be used in addition to information previously stored in the storage section 2. Such a communication device (5) may be either a wired device employing, for example, a general-purpose interface like RS-232C, USB (Universal Serial Bus) or IEEE1394 or a wireless device employing, for example, a protocol for portable terminal of the TDMA, CDMA, PHS or other scheme or employing a wireless LAN like the Bluetooth (trademark) or IEEE802.11b; alternatively, the communication device (5) may be constructed to be capable of both wired communication and wireless communication.

If, on the other hand, the external information acquisition device 5 is an external storage device, the external storage device (5) obtains desired information from among various information stored in an external storage medium; thus, various additionally stored information can be used in addition to various previously stored information. For example, in a case where a particular control program is not prestored in the ROM, the particular control program may be prestored in the external storage device, so that, by reading the control program from the external storage device into the RAM, the CPU is allowed to operate in exactly the same way as in the case where the particular control program is stored in the ROM. This arrangement greatly facilitates version upgrade of the control program, addition of a new control program, etc. The external storage device (5) may use any of various removable-type recording media, such as a semiconductor storage medium like a memory card or memory stick, magnetic storage medium like a floppy disk (FD), magneto-optical disk (MO), or optically-readable storage medium like a compact disk (CD-ROM or CD-RAM) or digital versatile disk (DVD).

The drive source 6 is an electric motor, internal combustion engine or the like for powering the vehicle. The drive source 6 is subjected to supplied power control, ignition timing control or the like performed by the control device 1, and the vehicle can be caused to run or stop by controlling the drive source 6. Each time the number of rotations of the drive source 6 changes, the control device 1 generates a sound generation event corresponding to the change in the number of rotations of the drive source 6, so that the sound generator device 7 is controlled on the basis of the sound generation event to generate predetermined effect sounds and/or musical sounds. In the instant embodiment, the sound generator device 7 is capable of simultaneously generating sound signals in a plurality of channels, and any of various sound generation schemes, such as the FM and PCM schemes, may be employed in the sound generator device 7. The following description will be made, assuming that the sound generator device 7 can control sound generation etc. in accordance with the MIDI standard. Note that the sound generator device 7 may be implemented either as electric circuitry or as a software program executed by a DSP (Digital Signal Processor) or CPU. In the latter case, the sound generation scheme to be employed in the sound generator device 7 can be readily changed, using the external information acquisition device 5 (the communication device or external storage device). Each sound signal generated by the sound generator device 7 in accordance with the sound generation event generated by the control device 1 is subjected to predetermined signal processing by a digital-to-analog (D/A) converter 8, and the resultant processed sound signal is audibly reproduced or sounded via a sound system 9 including an amplifier, speaker etc. Namely, the control device 1 generates a sound generation event and instructs the sound generator device 7 to generate/deaden (silence) a corresponding sound signal.

Next, a description will be made about various data stored in predetermined areas of the ROM and RAM of the above-mentioned storage section 2, with reference to FIGS. 2A and 2B. FIG. 2A is a conceptual diagram showing various data stored in the predetermined storage areas of the ROM and RAM, while FIG. 2B is a conceptual showing in detail of an example data format of a sound color assigning table.

As seen from FIG. 2A, the various data stored in the predetermined storage areas of the ROM include firmware (i.e., various control programs to be executed by the CPU), such as an engine control program and sound color control program, preset sound color data and preset sound color assigning table. On the other hand, the various data stored in the predetermined storage areas of the RAM include data generated as the CPU executes various control programs and then temporarily stored in a working area of the RAM, sound color data and sound color assigning table. The sound color data comprise parameters and data for defining colors of sounds to be generated by the sound generator device 7; where the MIDI specifications are employed, tone color data sets for 128 different sound colors are prestored in the ROM as preset sound color data sets. The sound color assigning table contains data for defining correspondence between operational states of various operators in the operation unit 3 and traveling states of the vehicle and the sound color data, in one-to-one relation; the preset sound color assigning table is prestored in the ROM similarly to the preset sound color data. Detailed data format of the sound color assigning table will be later described.

By contrast to the preset sound color data and sound color assigning table in the ROM, the sound color data and sound color assigning table stored in the RAM are, for example, data newly added from outside the vehicle via the communication device or external storage device 5, and/or data newly generated by the user copying and processing any of the preset data in the ROM. Namely, while the sound color data and sound color assigning table stored in the ROM are preset data which can not be changed or added to by the user, the sound color data and sound color assigning table stored in the RAM can be changed or added to by the user. Namely, in the instant embodiment, the user can add data, other than those stored in the ROM, to the sound color data and sound color assigning table from a memory card or server apparatus, as necessary.

This and following paragraphs explain in detail the data formats of the various data stored in the ROM and RAM, and particularly the data format of the sound color assigning table. The sound color assigning table contains data defining one-to-one correspondency between various events, such as operational states of various operators in the operation unit 3 and traveling states of the vehicle and predetermined sound color data; that is, the sound color assigning table associates predetermined sound color data with one of the events. In the illustrated example of FIG. 2B, there are provided a total of N sound color assigning tables; the sound color assigning table (Tbl1) of table number "1" is a table prestored in the ROM, while the other sound color assigning tables (Tbl2–TblN) are tables additionally added to the RAM. "Event Type" in the sound color assigning tables represents various types of sound generation events generated by the control device 1 detecting operational states of various operators in the operation unit 3 and traveling states of the vehicle. For example, "activation" event corresponds to a sound generation event generated by the control device 1 when the drive source 6 has been activated, i.e. turned on, "acceleration" event is a sound generation event generated by the control device 1 when the accelerator pedal of the operation unit 3 has been operated, and "steering wheel R" event is a sound generation event generated by the control device 1 when the steering wheel of the operation unit 3 has been turned to the right. Further, "number of rotation" event is a sound generation event generated by the control device 1 when the number of rotations of the drive source 6, such as the engine or electric motor, has increased or decreased by a predetermined value. Namely, the event types are defined in correspondence with operational states of various operators in the operation unit 3 and traveling states of the vehicle that can be detected by the control device 1.

In each of the sound color assigning tables (Tbl1–TblN), there are defined sound color numbers each indicating any one of sound color data sets that correspond to the event types and that are stored in the ROM and RAM. The sound generator device 7 generates predetermined effect sounds or musical sounds on the basis of any one of the sound color data sets determined by the detected event type, in accordance with a selected one of the sound color assigning tables. For example, where the sound color assigning table of table number "1" is selected by the user, and when the activation event has been generated, a sound color data set of sound color number "0" is designated so that predetermined effect sounds or musical sounds are generated on the basis of the sound color data set of sound color number "0"; for example, starting sounds of a petroleum engine, jet engine or rocket engine are generated on the basis of the sound color data set of sound color number "0". When a "winker R (L)" event or "horn" event has been generated, effect sounds, such as click sounds synchronous with blinking of the winker, or horn sounds corresponding to operation of the horn are generated.

Whereas the embodiment has been described above in relation to the case where the sound color assigning tables define one-to-one correspondency between each of various events, such as operational states of various operators in the operation unit 3 and traveling states of the vehicle, and a predetermined sound color data set. Alternatively, in the sound color assigning tables, only one tone color data set may be associated with a combination of a plurality of event types. For example, there may be provided an event type representing a combination of an operational state of the operation unit 3 and a traveling state of the vehicle, such as an "accelerator plus number of rotations" event, and a predetermined sound color data set may be associated with the "accelerator plus number of rotations" event. Further, there may be provided event types that vary according to an operation amount of the operation unit 3 and/or a variation amount of a traveling state of the vehicle, and different sound color data sets, having different sound volumes and/or sound pitches, may be associated with the respective event types. For example, there may be provided event types that correspond to stepwise traveling state variation amounts of the vehicle, such as "equal to or smaller than 3,000 rpm", "3,001 rpm–7,000 rpm" and "equal to or greater than 7,001 rpm", and different sound color data sets may be associated with the respective event types.

Note that characteristics, such as a sound color, volume, pitch or sound effect, of an effect sound or musical sound to be generated may be varied in accordance with an operation amount of any one of the operators in the operation unit 3, e.g. turned angle or steering angle of the steering wheel or stepped amount of the accelerator pedal. For example, the steering angle of the steering wheel may be converted into a velocity value, for example, on the assumption that the center or neutral steering position corresponds to a velocity value of "64", the rightward extreme steering position corresponds to a velocity value of "128" and the leftward extreme steering position corresponds to a velocity value of "0". In such a case, an effect sound or musical sound may be varied in sound color in accordance with the velocity value corresponding to the steering angle. Instead of allocating sound colors (sound color data sets) to the event types, any other suitable sound factors, such as scales or pitch bend amounts, may be allocated to the event types in such a manner that various sound control parameters, such as those defined in the MIDI standard, can be controlled. For example, scales of effect sounds or musical sounds may be associated with events to be generated in response to operation of predetermined switches, or pitch bend amounts may be associated with operation of the accelerator pedal, steering wheel and the like or different numbers of rotations of the drive source 6.

As noted above, the sound generator device 7 generates predetermined effect sounds or musical sounds on the basis of any one of the sound color data sets determined by the detected event type, in accordance with a previously selected one of the sound color assigning tables. Therefore, in the instant embodiment, the user is allowed to select a desired one of the sound color assigning tables. Namely, the user can determine a sound color assigning table to be used, from among the sound color assigning tables (Tbl1–TblN) stored in the ROM and RAM. Further, for each of the sound color assigning tables stored in the RAM, the user can change any one of the sound color data sets to be allocated to various event types. In this way, the vehicle can generate effect sounds or musical sounds desired by, i.e. suiting a preference of, the user. Therefore, the following paragraphs describe such a selection of a desired sound color assigning table and operator panel to be for changing a sound color data set to be allocated to any of the event types, with reference to FIG. 3.

FIG. 3 is a conceptual diagram showing an example of the operator panel employed in the instant embodiment. The operator panel includes a setting display section A, various buttons and switches, such as an increment switch B, decrement switch C, MODE button D and SET button E, for making various settings and generating predetermined panel switch events in response to user operation, and mode display lamp section F. The setting display section A includes, for example, an LED or LCD that is capable of displaying any of the unique table numbers assigned to the individual sound color assigning tables, unique sound color numbers assigned to the sound color data sets, unique event numbers assigned to the event types, etc. The increment switch B is a switch operable to increment, one by one, the numeric value displayed on the setting display section A; conversely, the decrement switch C is a switch operable to decrement, one by one, the numeric value displayed on the setting display section A. The MODE button D is a button operable to place the vehicle in a desired one of modes for selecting a sound color assigning table to be used, selecting an event type and selecting a sound color data set. For example, the vehicle can be placed in the mode for selecting a sound color assigning table when the MODE button D is depressed once in an initial state (also called a standby state), can be shifted in the mode for selecting an event type when the MODE button D is depressed in the sound-color-assigning-table selecting mode, and can be then shifted in the mode for selecting a sound color data set when the MODE button D is depressed in the event-type selecting mode. Namely, each time the MODE button D is depressed, the data setting mode of the vehicle can be shifted stepwise from the sound-color-assigning-table selecting mode to the event-type selecting mode, from the event-type selecting mode to the sound-color selecting mode, or the like. In accordance with the thus-determined mode, any one of the sound color-assigning table number, event number and sound color number is displayed on the setting display section A.

The SET button is a button operable to finally establish a setting. Depressing this SET button once can finally establish a setting of any one of the sound color-assigning table number, event number and sound color number displayed on the setting display section A, and also can return the data setting mode of the vehicle to a mode level immediately above the current mode level. Namely, each time the SET button is depressed, the data setting mode of the vehicle can be shifted stepwise from the sound-color-data selecting mode to the event-type selecting mode, from the event-type selecting mode to the sound-color-assigning-table selecting mode, or the like. The mode display lamp F displays a currently-set data setting mode by illumination of an LED or the like, so that the user can judge which one of the sound color assigning table number, event number and sound color number is the number currently displayed on the setting display section A. Namely, when the table (TBL) display lamp of the mode display lamp section F is being illuminated, the user can know that the number currently displayed on the setting display section A is a sound color-assigning table number. When the EVENT display lamp is being illuminated, the user can know that the number currently displayed on the setting display section A is an event number. Similarly, when the ASSIGN display lamp is being illuminated, the user can know that the number currently displayed on the setting display section A is a sound color number. FIG. 3 shows a case where the vehicle is in the sound-color-assigning-table selecting mode and the sound color assigning table of table number “1” is selected.

Here, an exemplary manner of changing the sound color data via the operator panel in the instant embodiment is described, using the sound color assigning table of FIG. 2B, in relation to a case where a sound color data set of sound color number “10”, corresponding to the event type “number of rotations” (let it be assumed that event number “11” is assigned to the event type “number of rotations”) in the sound color assigning table (TBL2), is to be changed to another sound color data set of sound color number “259”.

First, the user depresses the MODE button D to set the vehicle in the sound-color-assigning-table selecting mode, and causes the setting display section A to display number “2” using the increment switch B or decrement switch C. Then, the user again depresses the MODE button D to set the vehicle in the event-type selecting mode, and causes the setting display section A to display number “11” using the increment switch B or decrement switch C. After these, the user again depresses the MODE button D to set the vehicle in the sound-color selecting mode, and causes the setting display section A to display number “259” using the increment switch B or decrement switch C. Then, the user depresses the SET button E to finally establish the settings of the sound color assigning table, event type and sound color. Once the settings of sound color assigning table, event type and sound color are finally established in this manner, the data setting mode of the vehicle is automatically changed to the event type selecting mode even without the MODE button D being depressed. When the sound color data set corresponding to the event type “brake” (let it be assumed that event number “4” is assigned to the event type “brake”) is to be changed, the user can do so by causing the setting display section A to display number “4” using the increment switch B or decrement switch C and then depressing the MODE button D.

Note that a particular sound color assigning table to be used may be automatically selected without the operator panel as described above being used. For example, a particular sound color assigning table to be used may be automatically selected in accordance with an actual traveled distance or mileage of the vehicle, charged condition of a battery for powering the electric motor, amount of fuel supply to the petroleum engine, and/or the like.

If the value displayed on the setting display section A has exceeded a predetermined upper limit or lower limit when the user depresses the increment switch B or decrement switch C on the operator panel, then the display of the setting display section A is fixed at the upper limit or lower limit irrespective of user’s continued depression of the switch B or C.

Whereas the embodiment has been described in relation to the case where the data setting mode of the vehicle is shifted by one model level each time the MODE button D or SET button E is operated, the present invention is not so limited. For example, arrangements may be made such that the data setting mode of the vehicle is shifted by two model levels each time the MODE button D and SET button E are operated at the same time. As a specific example, the vehicle may be set from the standby state to the event selecting mode, jumping the sound-color-assigning-table selecting mode, when the MODE button D and SET button E are operated at the same time.

Figure 4:
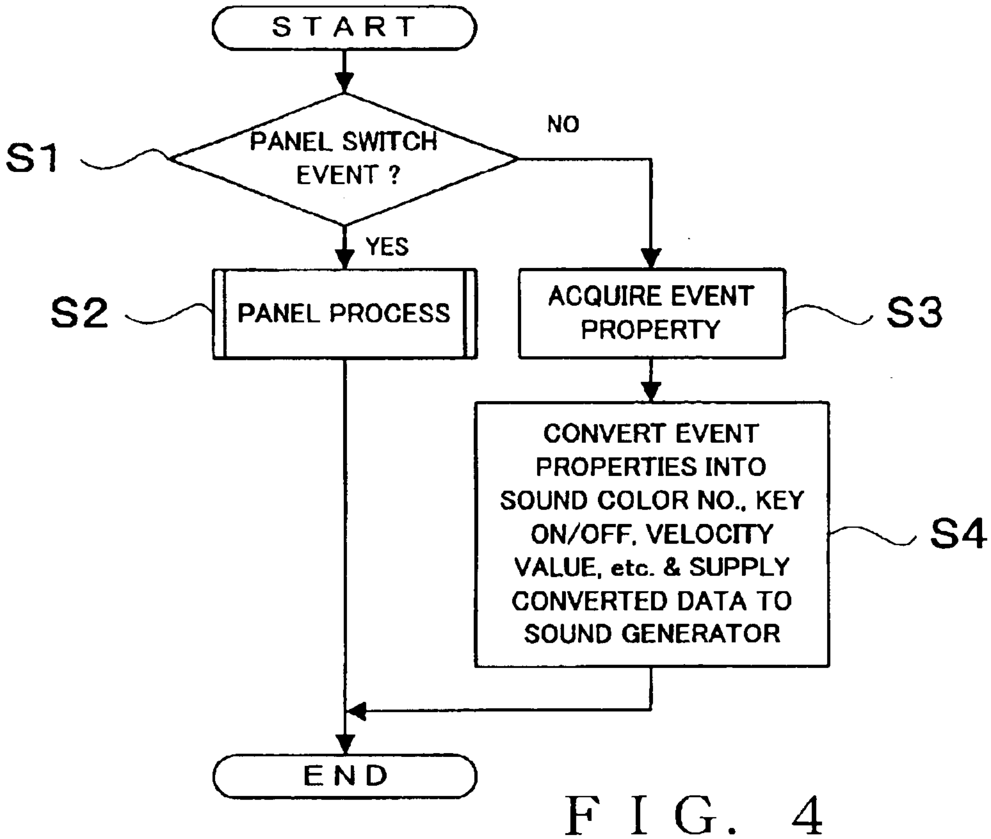
FIG. 4 is a flow chart showing an example of event processing carried out by a control device in the vehicle control system of FIG. 1.

As set forth above, the vehicle of the present invention determines a sound color data set, corresponding to a sound generation event (event type) generated in response to any of operational states of the operation unit 3 and traveling states of the vehicle, in accordance with a sound color assigning table, and generates predetermined effect sounds or musical sounds on the basis of the determined sound color data set. Effect sounds and/or musical sounds suiting user's preference can be generated, in accordance with any of operational states of the operation unit 3 and traveling states of the vehicle, by the user appropriately changing the sound color data set corresponding to a given sound generation event; namely, the vehicle can change sounds to be generated as desired by the user. The event processing for permitting sound changes will be described below. FIG. 4 is a flow chart showing an example of the event processing carried out by the control device 1 in the vehicle control system of FIG. 1.

At first step S1 of the event processing, a determination is made as to whether an event having been obtained by the control device 1 in response to a particular operational state or traveling state is a panel switch event, i.e. an event generated by user's operation of any one of the various buttons and switches on the operator panel (see FIG. 3). If the newly-obtained event is a panel switch event, i.e. if any one of the various buttons and switches on the operator panel has been operated, as determined at step S1 (YES determination at step S1), the control device 1 proceeds to step S2 to execute a panel process. The panel process is intended to change a sound color data set corresponding to a sound generation event (event type) that has been generated in accordance with any of operational states of the operation unit 3 and traveling states of the vehicle, as will be later described in detail. If, on the other hand, the newly-obtained event is not a panel switch event, i.e. if the newly-obtained event is a sound generation event generated in response to detection of any of operational states of various operators in the operation unit 3, other than operators of the operator panel, traveling states of the vehicle, etc. (NO determination at step S1), the control device 1 obtains event properties at step S3.

The reason why the control device 1 obtains event properties is that each sound generation even, other than panel switch events, has at least the following event properties (event parameters). The event properties include, for example, an event number, sound generation condition, operation amount, etc. The event number is a unique identification (ID) number given to each of the event types associated with the sound colors in the sound color assigning tables. For example, event number "3" is given to the "acceleration" event, event number "8" is given to the "steering wheel L" event, and so on. The sound generation condition is a key-on or key-off condition; for example, a key-on condition is set when predetermined switch-ON operation has been performed or the vehicle has shifted from a non-traveling (stationary) state to a traveling state, and a key-off condition is set when predetermined switch-OFF operation has been performed or the vehicle has shifted from a traveling state to a non-traveling state. As the operation amount is set an accelerator opening degree, steering angle of the steering wheel, number of rotations of the engine or electric motor, acceleration or speed variation of the vehicle, or the like.

At step S4, each of the obtained event properties is converted into another form of data and supplied to the sound generator device 7. Namely, the event number is converted into a sound color number, the sound generation condition is converted into a key-on or key-off signal and the operation amount is converted into a velocity value, so that these converted properties are supplied to the sound generator device 7. On the basis of the supplied properties, the sound generator device 7 generates predetermined effect sounds and/or musical sounds.

Let it be assumed here that correspondency between a velocity value and a sound characteristic, such as a sound volume, color or pitch, is defined in each of the sound color data sets. For example, control is performed on the sound color of false exhaust sounds such that the sound volume is increased and the amount of high frequency components is increased in proportion to the accelerator opening. The correspondency between the velocity value and the sound characteristic may be either linear or nonlinear. Alternatively, there may be provided a plurality of predefined converting tables so that one or more of the converting tables to be looked up can be defined for each of the sound colors.

Whereas the event processing has been described above in relation to the case where the sound generator device 7 is controlled in accordance with the MIDI standard, the present invention is not so limited. For example, there may be defined and used a kind of dedicated control command group for controlling generation and characteristics of sounds, and needless to say, a control command group created by merely simplifying the MIDI standard may be used to control incoming-call alerting melodies (ring melodies) for portable phones.

Figure 5:
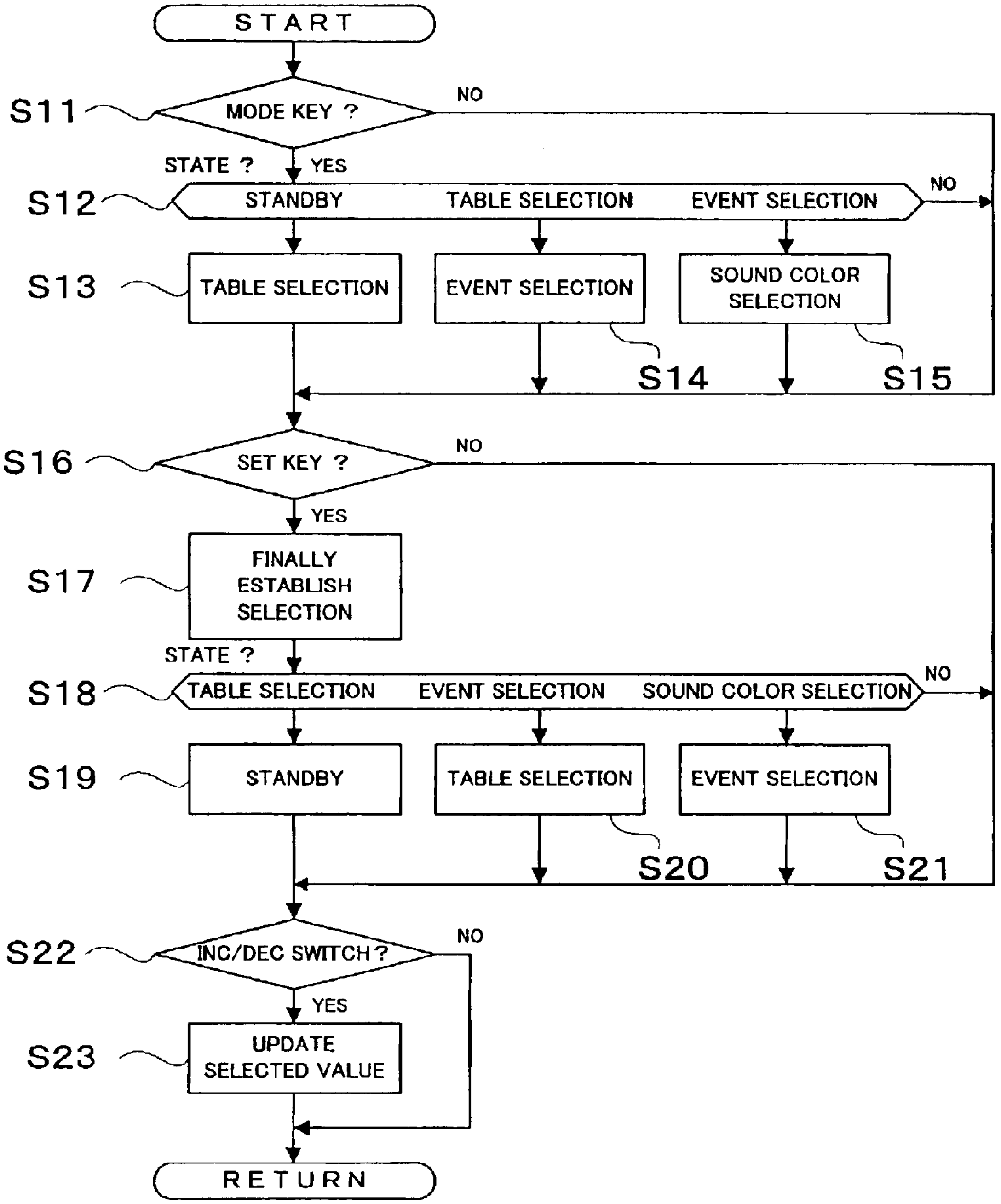
FIG. 5 is a flow chart of a panel process carried out during the event processing of FIG. 4.

Next, a description will be given about the panel process carried out at step S2 of the event processing (FIG. 2) in response to operation on the operator panel. FIG. 5 is a flow chart of the panel process carried out in the event processing of FIG. 4.

First, at step S11, a determination is made as to whether or not the newly obtained panel switch event is a mode switch key event generated in response to operation of the mode button D provided on the operator panel. If the newly obtained panel switch event is not a mode switch key event as determined at step S11 (NO determination at step S11), the control device 1 jumps to step S16. If, on the other hand, the newly obtained panel switch event is a mode switch key event as determined at step S11 (YES determination at step S11), the control device 1 determines at step S12 the currently set state of the vehicle. If the currently set state of the vehicle is the standby state, i.e. the initial state other than the above-described data setting modes, as determined at step S12, the vehicle is switched to the sound-color-assigning-table selecting mode at step S13. If the currently set state of the vehicle is the sound-color-assigning-table selecting mode, the vehicle is switched to the event-type selecting mode at step S14. Further, if the currently set state of the vehicle is the event-type selecting mode, the vehicle is switched to the sound-color selecting mode at step S15. If the currently set state of the vehicle is other than the above-mentioned standby state, sound-color-assigning-table selecting mode and event-type selecting mode, i.e. if the currently set state of the vehicle is the sound-color selecting mode, (NO determination at step S13), the control device 1 goes to step S16 without changing the currently set state of the vehicle. In this way, each time the MODE button D is depressed once, the data setting mode of the vehicle can be shifted stepwise from the standby state to the sound-color-assigning-table selecting mode, from the sound-color-assigning-table selecting mode to the event-type selecting mode, or from the event-type selecting mode to the sound-color selecting mode; that is, each depression of the MODE button D can shift the data setting level to another level immediately below the current data setting level.

At step S16, it is determined whether the obtained panel switch event is a SET key event generated in response to operation of the SET button E. If the obtained panel switch event is not a SET key event as determined at step S16 (NO determination at step S16), the control device 1 jumps to step S22. If, on the other hand, the obtained panel switch event is a SET key event as determined at step S16 (YES determination at step S16), the control device 1 finally establishes the user's selection, at step S17. Namely, any one of table, event and sound color numbers is finally established in accordance with the currently set state of the vehicle and displayed contents on the setting display section A of the operator panel. At next step S18, the control device 1 determines the currently set state of the vehicle. If the currently set state of the vehicle is the sound-color-assigning-table selecting mode, then the vehicle is shifted to the standby state at step S19. If the currently set state of the vehicle is the event-type selecting mode, then the vehicle is shifted to the sound-color-assigning-table selecting mode at step S20. If the currently set state of the vehicle is the sound-color selecting mode, then the vehicle is shifted to the event-type selecting mode at step S21. If the currently set state of the vehicle is other than the sound-color-assigning-table selecting mode, event-type selecting mode and sound-color selecting mode, i.e. if the currently set state is the standby state, (NO determination at step S19), the control device 1 goes to step S22. In this way, each time the SET button D is depressed once, the data setting mode of the vehicle can be shifted stepwise from the sound-color selecting mode to the event-type selecting mode, from the event-type selecting mode to the sound-color-assigning-table selecting mode, or from the sound-color-assigning-table selecting mode to the standby state; that is, each depression of the SET button E can shift the current data setting level to another level immediately above the current data setting level.

At step S22, it is determined whether the obtained panel switch event is an increment key event or decrement key event generated in response to operation of the increment switch B or decrement switch C. If the obtained panel switch event is an increment key event or decrement key event as determined at step S22 (YES determination at step S22), the selected value is updated at step S23. Namely, if the obtained panel switch event is an increment key event, the numerical value displayed on the setting display section A is updated with a new selected value calculated by adding one to the current displayed numerical value per depression of the increment switch B, or if the obtained panel switch event is a decrement key event, the numerical value displayed on the setting display section A is updated with a new selected value calculated by subtracting one from the current displayed numerical value per depression of the increment switch B.

In the above-described manner, the user is allowed to change a sound color data set to be allocated to each event type defined in the sound color assigning table, using the mode button D, SET button E and increment switch B or decrement switch C.

Figure 6:
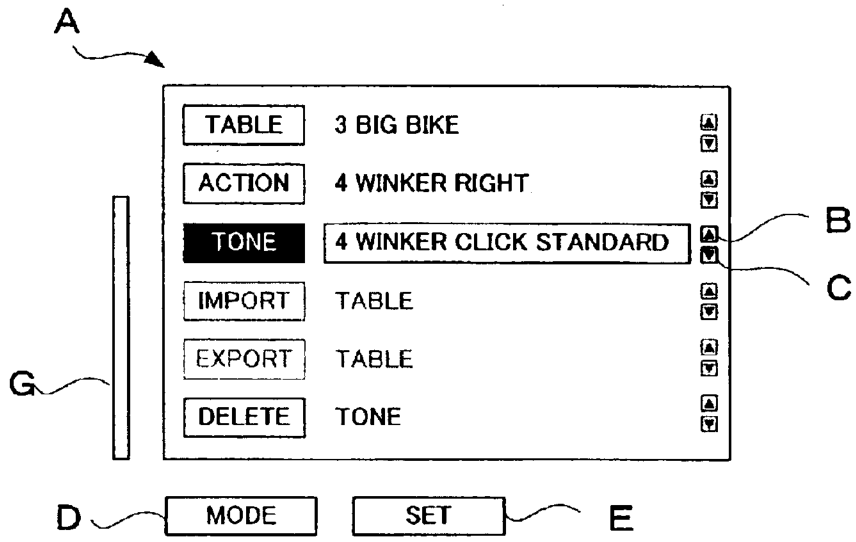
FIG. 6 is a conceptual diagram showing a modification of the operator panel.

The following paragraphs describe a modification of the operator panel, with reference to FIG. 6. FIG. 6 is a conceptual diagram showing the modification of the operator panel. The modified operator panel includes a setting display section A, various switches, such as an increment switch B, decrement switch C, MODE button D and SET button E, and a card slot G. On the setting display section A, there is displayed a listing of data setting modes, which include indicators of a sound-color-assigning-table selection mode (TABLE), event-type selecting mode (ACTION), sound-color selecting mode (TONE), import mode (IMPORT), export mode (EXPORT) and delete mode (DELETE) and current settings of the modes.

The sound-color-assigning-table selection mode (TABLE) is for selecting a desired sound color assigning-table, the event-type selecting mode (ACTION) is for selecting a desired event type, and the sound-color selecting mode (TONE) is for selecting a desired sound color data set. As illustrated, the setting display section A displays the respective indicators "TABLE", "ACTION" and "TONE" of the selecting modes, as well as data numbers and data names as current settings. The current setting of each of the selecting modes can be changed using the increment switch B or decrement switch C. Namely, the increment switch B and decrement switch C are each operable to change the current settings of the individual modes. For example, when the increment switch B has been operated for a particular one of the modes, the current setting of the particular mode can be changed by adding 1 (one) to the current table number, event number or sound color number per operation of the increment switch B, or when the decrement switch C has been operated for a particular one of the modes, the current setting of the particular mode can be changed by subtracting 1 (one) from the current table number, event number or sound color number per operation of the decrement switch C.

The import mode (indicator "IMPORT") is a mode for obtaining or importing data from an external storage medium inserted in the card slot G, and data selectable in this import mode is either a sound color assigning table (TABLE) or a sound color data set (TONE). In the import mode, either a sound color assigning table (TABLE) or a sound color data set (TONE) can be changed by operation of the increment switch B or decrement switch C. All data of the sound color assigning table (TABLE) or sound color data set (TONE) are collectively acquired from the external storage medium inserted in the card slot G. Needless to say, data not recorded in the external storage medium can not be selected. Once the external storage medium is inserted in the card slot G, the control device 1 checks contents of the inserted external storage medium for presence/absence of empty areas and recorded data and type of the medium. If the inserted external storage medium is completely empty, i.e. has no data recorded therein, "Unable" is displayed on the setting display section A.

Contrary to the import mode, the export mode (indicator "EXPORT") is for writing data into an external storage medium inserted in the card slot G. However, as in the import mode, data selectable in this export mode is either a sound color assigning table (TABLE) or sound color data set (TONE). In the export mode, either a sound color assigning table (TABLE) or sound color data set (TONE) can be changed by operation of the increment switch B or decrement switch C. In the export mode, when the external storage medium inserted in the card slot G does not have a sufficient empty space, "Unable" is displayed on the setting display section A, because data can not be written into to the inserted external storage medium. The delete mode (indicator "DELETE") is for deleting sound color assigning data or sound color data stored in the RAM, i.e. data of a sound color assigning table (TABLE) or sound color data set (TONE) other than preset data that can be changed or added to by the user. When particular data are to be deleted in the delete mode, the current setting of a sound color assigning table or sound color data set that was being selected till immediately before the deletion. Upon completion of the deletion, the table number of the sound color assigning table or sound color number of the sound color data set which was being selected till immediately before the deletion (namely, empty table number or empty sound color number after the deletion) is displayed as a data number, and "Blank" is displayed as a data name.

The MODE button D is a mode for selecting a desired one of the data setting modes, and each time the MODE button D is depressed, any one of a plurality of the data setting modes can be selected in a cyclic fashion. The data setting mode currently selected is shown on the setting display section A by reverse (video) display of the corresponding indicator on the left of the setting display section A, and the current setting is displayed in a highlighted fashion. , In the illustrated example of FIG. 6, the sound-color-data selecting mode (TONE) is displayed as the data setting mode in reverse video (white letters on black), and "4 WINKER CLICK STANDARD" is displayed as the current setting in a highlighted fashion. In this way, the current data setting mode and data setting can be clearly presented to the user. In displaying the listing of data setting modes on the setting display section A, the indicator and setting of each non-selectable data setting mode are displayed thinly as compared to those of the other data setting modes or are not displayed at all. For example, when no external storage medium is inserted in the card slot G, it is not possible to import or export data. Thus, in such a case, selection of the import mode and export mode is inhibited and their respective indicators and settings are displayed thinly, which is convenient in that the user can readily appreciate that the import mode and export mode are non-selectable.

As set forth above, the instant embodiment of the vehicle generates predetermined effect sounds and/or musical sounds, defined by the user using the operator panel, in response to any of operational states of various operators in the operation unit and traveling states of the vehicle. Among various traveling states of the vehicle to be detected, in the instant embodiment, as triggers to generate sound generation events are: acceleration/deceleration state of the vehicle; the number of rotations of the drive source 6; and operational states of various operators in the operation unit 3 such as operation of the steering wheel, accelerator pedal and brake pedal and ON/OFF operation of various switches. As further triggers to generate sound generation events, there may be detected a shift of the vehicle from the non-traveling condition to the traveling condition (in which case idling sounds of the vehicle are switched to running sounds) and a shift of the vehicle from the traveling condition to the non-traveling condition (in which case running sounds of the vehicle are switched to idling sounds). As a further trigger, there may be detected a remaining power amount or charged condition of a battery in an electromotive vehicle using a motor, or a remaining fuel amount and fuel supply condition of a vehicle using an internal combustion engine.

Figure 7:
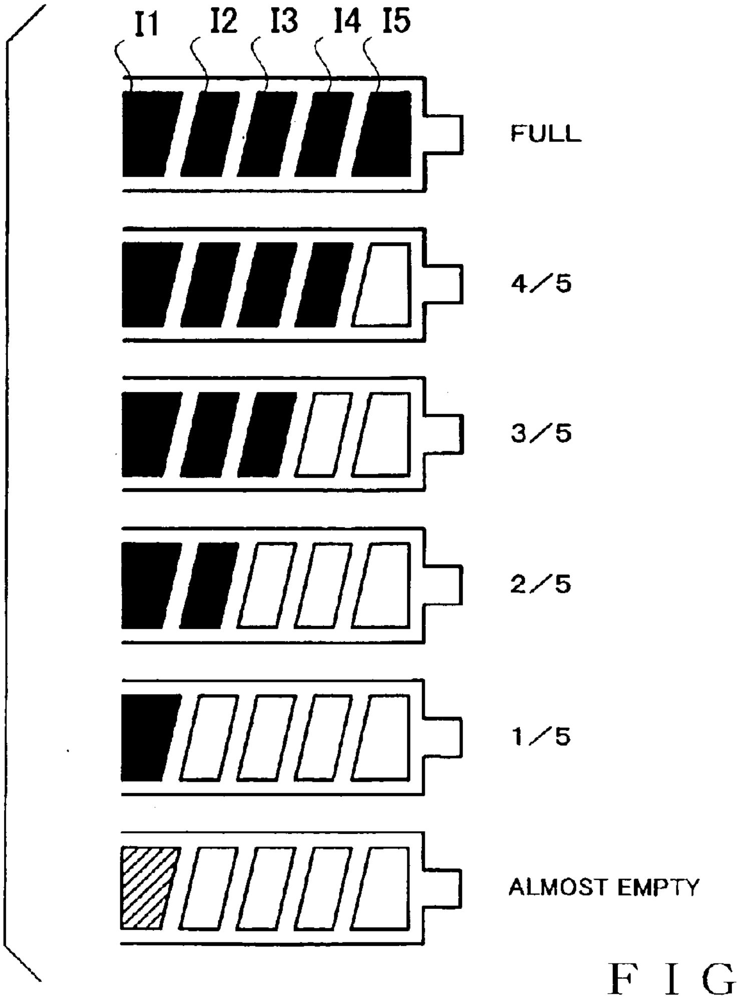
FIG. 7 is a diagram conceptually showing an example of a remaining power amount (or charged condition) display made in the vehicle.

This and following paragraphs briefly describe the case where a remaining power amount or charged condition of the battery is detected, with reference to FIG. 7. FIG. 7 is a diagram conceptually showing an example display of a remaining power amount (or charged condition) on the display unit 4. The remaining power amount display visually indicates a remaining power amount in the battery for supplying electric power necessary for activating the motor that is the drive source of the electric vehicle. In the remaining power amount display, predetermined one or more of a plurality of (in the illustrated example, five) display segments I1 to I5, corresponding to the current remaining power amount, are illuminated (turned on), so that the illuminated state of the display segments I1 to I5 can readily inform the user of the current remaining power amount. For example, when the battery is charged to its full capacity, i.e. has a sufficient remaining power amount, all of the display segments I1 to I5 are illuminated as shown in the uppermost row of the figure. As the remaining power amount decreases, the display segments I1 to I5 are deilluminated one by one (see the second to fifth rows of the figure). When the electric power of the battery has almost run out, only the segment I1 is blinked (see the bottom row of the figure). When the battery is being recharged, the changing charged condition of the battery is informed to the user by the display segments being sequentially illuminated in the order from the bottom row to the top row of the figure that is opposite from the order when the remaining power amount is displayed.

By generating musical sounds in synchronism with illumination/deillumination of the display segments, it is possible to inform the user of the current remaining power amount by both the visual display and the sounds, i.e. visually and auditorily. Namely, by generating a different sound per change in the remaining power amount display, the instant embodiment can auditorily inform the user of a changing remaining power amount. Further, when the battery has almost run out of the electric power, warning sounds are generated to call user's attention. When the battery is recharged too, different musical sounds are generated in accordance with a changing charged condition, i.e. in synchronism with illumination/deillumination of the display segments at the beginning of the recharge, during the recharge and upon completion of the recharge, to thereby inform the user of the changing charged condition by both the visual display and the sounds. For example, at the beginning of the recharge of the battery, a musical sound is generated to auditorily inform the user that the desired recharge of the battery has started appropriately. During the recharge of the battery, another kind of musical sound is generated such that the user can recognize from the sound that the recharge is currently under way. Further, upon completion of the recharge of the battery, still another kind of musical sound is generated to inform the user that the desired recharge of the battery has been completed.

Among various operational states of the operation unit 3 to be detected, in the instant embodiment, as triggers to generate sound generation events are: acceptability/non-acceptability of user's operation on the operator panel (to be described later); ON/OFF operation of a main key switch instructing a start or stop of electric power supply from the battery to various parts of the vehicle (namely, turning on or off of the power supply); locking/unlocking operation of the steering wheel, door or the like of the vehicle; setting/canceling operation of a personal identification number in a case where the vehicle is placed in a condition ready to travel in response to entry of the personal identification number; and opening/closing operation of a door (door knob operation).

This and following paragraphs briefly describe the detection of the acceptability/non-acceptability of user's operation on the operator panel. Here, detection is made of user operation of any one of the switches on the operator panel, and a musical sound is generated in response to detected switch operation. At that time, validity of the detected switch operation is determined in accordance with conditions of the vehicle at the time of the switch operation, and a different musical sound is generated in accordance with the determined result so as to auditorily inform the user that the detected switch operation is valid (acceptable) or invalid (non-acceptable). The meter switches are operable to display, on the display unit 4, a traveling speed, traveling distance, etc. of the vehicle. Among such meter switches are setting registration switches for registering various settings, such as setting/cancellation of a personal identification number, a traveled-distance display mode switch for switching a traveled distance display between an odometer display mode (i.e., mode for displaying a total traveled distance or mileage of the vehicle) and a trip meter display mode (i.e., mode for displaying a total traveled distance or mileage of the vehicle during a particular trip or after the reset). When the traveled-distance display mode switch has been operated by the user, the user's operation of the traveled-distance display mode switch is judged as valid operation, and the vehicle generates, in response to the switching between the odometer display mode and the trip meter display mode, a particular musical sound informing that the user's operation of the traveled-distance display mode switch is valid. Once any one of the setting registration switches is operated during travel of the vehicle, the operation of the setting registration switch is judged as invalid because the setting operation during travel of the vehicle is dangerous, and the vehicle generates a musical sound auditorily informing that the setting operation is invalid without accepting the setting operation. In this manner, the vehicle determines acceptability/non-acceptability of user's operation on the operator panel and then generates the musical sound informing that the user's operation is valid (acceptable) or invalid (non-acceptable). Thus, the above-described arrangements are very convenient in that the user is allowed to readily ascertain, by the generated sound, whether the user's operation is valid (acceptable) or invalid (non-acceptable), without bothering to view the display.

According to the present invention, variation in any other detectable states than the above-mentioned traveling states of the vehicle and operational states of the operation unit 3 may be detected so that predetermined effect sounds and/or musical sounds are generated in response to detection of the state variation. For example, a seated state of the user on the vehicle seat, which is neither associated with the traveling states of the vehicle nor associated with the operational states of the operation unit 3, may be detected so as to generate a musical sound corresponding to the detected seated state.

Note that, when the increment switch B or decrement switch C has been depressed to change a sound color data set in the sound-color-data selecting mode, the vehicle may automatically reproduce a sound color corresponding to the changed sound color data set so that the user can actually hear and ascertain the sound color.

It should be appreciated that external storage media to be inserted in the card slot G are not limited to physical storage media. For example, a data communicating card may be inserted in the card slot G so that an external storage medium on a communication network can be virtually mounted. Further, the panel process, which carries out operations corresponding to the physical mounting on the operator panel or user's operation on the operator panel as set forth above, may be executed by external equipment connected to the vehicle, such as a portable phone, PDA, personal computer, electronic game device, MIDI device or dedicated device. Namely, the above-described operator panel may be displayed on a display screen of the external equipment so that various instructions can be given to the vehicle via the displayed operator panel.

Further, whereas the embodiment of the present invention has been described above in relation to a vehicle capable of actually traveling, the present invention may be applied to vehicles that do not actually travel or run; for example, the present invention may be applied to any vehicle (or part of a vehicle) to be used in driving simulators and game devices. Needless to say, the vehicle may be other than a motor vehicle or motorcycle, such as a tractor, airplane, ship or electric train.

Furthermore, according to the present invention, the arrangement, functions and number of the operators on the operator panel and the contents and layouts of information displayed on the display screen of the operator panel are not limited to those described above in relation to the embodiment of the invention. Namely, any suitable arrangement, functions and number of the operators on the operator panel and the contents and layouts of information displayed on the display screen of the operator panel other than those described above in relation to the embodiment of the invention may be chosen, as long as the user can, via the operator panel, set correspondency between events and sounds to be generated by the vehicle (i.e., modifications and changes of the sound color assigning tables) and instruct reading/writing of the sound color assigning tables and sound color data.

Furthermore, whereas the present invention has been described above as an apparatus and software programs incorporated in a vehicle, part or the whole of the construction of the present invention may be implemented by an apparatus or software programs retrofitted or externally attached to the vehicle. For example, the construction of the present invention may be implemented by retrofitting to the vehicle a set of a sound-generation controlling control device, sound generator device, display unit, operation unit and storage device containing sound color data and sound color assigning tables.

In summary, the present invention is characterized by generating predetermined effect sounds or musical sounds, defined by the user using operators of the operator panel, in response to traveling and operational states of the vehicle. With this arrangement, the present invention can provide a novel vehicle which is capable of positively calling attention of the vehicle driver and pedestrians by use of original sounds and which allows the driver to drive the vehicle with a lot of enjoyment, pleasure and fun.

The present invention relates to the subject matter of Japanese Patent Application No. 2002-152127 filed on May 27, 2002, the disclosure of which is expressly incorporated herein by reference in its entirety.

What is claimed is:

1. A vehicle comprising:

an operational state detection section that detects operational states of one or more operators provided in said vehicle and generates operational information corresponding to the detected operational states;

a traveling state detection section that detects one or more traveling states of said vehicle and generates traveling information corresponding to the detected traveling states;

an association section that associates relationship between various operational state information and traveling state information and various sound control information;

a change section that changes the relationship associated by said association section;

a sound control information acquisition section that refers to the relationship changed via said change section, to acquire sound control information corresponding to at least one of operational information and traveling information generated by said operational state detection section and said traveling state detection section; and a sound generation section that generates a sound signal on the basis of the sound control information acquired by said sound control information acquisition section.

2. A vehicle as claimed in claim 1 wherein said association section associates the sound control information in such a manner that at least one of a sound volume and sound pitch is variably controlled in accordance with an operation amount indicated by operational information of a given one of the operators, whereby a sound volume or sound pitch of a sound signal to be generated by said sound generation section is variably controlled in response to operation of the given operator.

3. A vehicle as claimed in claim 1 wherein said association section includes storage section storing various sound control information in association with various operational state information and traveling state information.

4. A vehicle as claimed in claim 1 wherein said vehicle is a motor vehicle or motorcycle including an electric motor as a drive source thereof.

5. A vehicle as claimed in claim 1 wherein said operators include at least one of a steering wheel, accelerator pedal, brake pedal and various switches.

6. A vehicle as claimed in claim 1 wherein the traveling states of said vehicle include at least one of an accelerating/decelerating state of said vehicle, number of rotations of a motor or engine provided in said vehicle, shift from a non-traveling state to a traveling state of said vehicle, shift from a traveling state to a non-traveling state of said vehicle, remaining electric power amount in a battery provided in said vehicle, charged condition of the battery and remaining amount of fuel in said vehicle.

7. A vehicle as claimed in claim 1 wherein said change section changes the relationship, associated by said association section, in accordance with data input from outside said vehicle.

8. A vehicle as claimed in claim 1 wherein the relationship associated by said association section comprises a plurality of tables, and which further comprises a reception section that receives, from outside said vehicle, data for updating the sound control information in any one of the plurality of tables, or a set of data constituting a new table, whereby said change section updates contents of the one table adds the new table to said association section.

9. A vehicle comprising:

an operational state detection section that detects operational states of one or more operators provided in said vehicle and generates operational information corresponding to the detected operational states;

a traveling state detection section that detects one or more traveling states of said vehicle and generates traveling information corresponding to the detected traveling states;

a table section that includes a plurality of tables each associating relationship between various operational information and traveling information and various sound control information;

a reception section that receives, from outside said vehicle, data to update the sound control information associated by any one of said tables or a set of data to construct a new table, whereby contents of the one table in said table section are updated or a new table is added to said table section;

a selection section that selects any one of said plurality of tables;

a sound control information acquisition section that refers to the relationship associated by the table selected via said selection section, to acquire sound control information corresponding to at least one of operational information and traveling information generated by said operational state detection section and traveling state detection section; and a sound generation section that generates a sound signal on the basis of the sound control information acquired by said sound control information acquisition section.

10. A vehicle as claimed in claim 9 wherein said vehicle is a motor vehicle or motorcycle including an electric motor as a drive source thereof.

11. A vehicle as claimed in claim 9 wherein said operators include at least one of a steering wheel, accelerator pedal, brake pedal and various switches.

12. A vehicle as claimed in claim 9 wherein the traveling states of said vehicle include at least one of an accelerating/decelerating state of said vehicle, number of rotations of a motor or engine provided in said vehicle, shift from a non-traveling state to a traveling state of said vehicle, shift from a traveling state to a non-traveling state of said vehicle, remaining electric power amount in a battery provided in said vehicle, charged condition of the battery and remaining amount of fuel in said vehicle.

13. A vehicle as claimed in claim 9 wherein a given one of said plurality of tables associates the sound control information in such a manner that at least one of a sound volume and sound pitch is variably controlled in accordance with an operation amount indicated by operational information of a given one of the operators, whereby, when the given table is selected via said selection section, a sound volume or sound pitch of a sound signal to be generated by said sound generation section is variably controlled in response to operation of the given operator.

14. A method for auditorily informing a state of a vehicle, said method comprising:

a step of detecting operational states of one or more operators provided in said vehicle and generating operational information corresponding to the detected operational states;

a step of detecting one or more traveling states of said vehicle and generating traveling information corresponding to the detected traveling states;

a step of associating relationship between various operational state information and traveling state information and various sound control information;

a step of changing the relationship associated by said step of associating;

an acquisition step of referring to the relationship changed via said step of changing, to acquire sound control information corresponding to at least one of operational information and traveling information generated by said step of detecting operational states and said step of detecting one or more traveling states; and a step of generating a sound signal on the basis of the sound control information acquired by said acquisition step.

15. A method for auditorily informing a state of a vehicle, said method comprising:

a step of detecting operational states of one or more operators provided in said vehicle and generating operational information corresponding to the detected operational states;

a step of detecting one or more traveling states of said vehicle and generating traveling information corresponding to the detected traveling states;

a step of selecting any one of a plurality of tables each associating relationship between various operational information and traveling information and various sound control information;

a step of receiving, from outside said vehicle, data to update the sound control information associated by any one of said tables or a set of data to construct a new table, whereby contents of the one able in said plurality of tables are updated or a new table is added to said plurality of tables;

an acquisition step of referring to the relationship associated by the table selected via said step of selecting, to acquire sound control information corresponding to at least one of operational information and traveling information generated by said step of detecting operational states and said step of detecting one or more traveling states; and a step of generating a sound signal on the basis of the sound control information acquired by said acquisition step.

16. A program containing a group of instructions for causing a computer to perform a method for auditorily informing a state of a vehicle, said method comprising:

a step of detecting operational states of one or more operators provided in said vehicle and generating operational information corresponding to the detected operational states;

a step of detecting one or more traveling states of said vehicle and generating traveling information corresponding to the detected traveling states;

a step of associating relationship between various operational state information and traveling state information and various sound control information;

a step of changing the relationship associated by said step of associating;

an acquisition step of referring to the relationship changed via said step of changing, to acquire sound control information corresponding to at least one of operational information and traveling information generated by said step of detecting operational states and said step of detecting one or more traveling states; and a step of generating a sound signal on the basis of the sound control information acquired by said acquisition step.

17. A program containing a group of instructions for causing a computer to perform a method for auditorily informing a state of a vehicle, said method comprising:

a step of detecting operational states of one or more operators provided in said vehicle and generating operational information corresponding to the detected operational states;

a step of detecting one or more traveling states of said vehicle and generating traveling information corresponding to the detected traveling states;

a step of selecting any one of a plurality of tables each associating relationship between various operational information and traveling information and various sound control information;

a step of receiving, from outside said vehicle, data to update the sound control information associated by any one of said tables or a set of data to construct a new table, whereby contents of the one able in said plurality of tables are updated or a new table is added to said plurality of tables;

an acquisition step of referring to the relationship associated by the table selected via said step of selecting, to acquire sound control information corresponding to at least one of operational information and traveling information generated by said step of detecting operational states and said step of detecting one or more traveling states; and a step of generating a sound signal on the basis of the sound control information acquired by said acquisition step.

* * * * *